United States Patent [19]

Tsunoda

[11] 4,159,420
[45] Jun. 26, 1979

[54] APPARATUS FOR DETECTING OILS AND THE LIKE

[75] Inventor: Akiyoshi Tsunoda, Ohmiya, Japan

[73] Assignee: Denki Kagaku Keiki Co., Ltd., Japan

[21] Appl. No.: 859,461

[22] Filed: Dec. 12, 1977

[30] Foreign Application Priority Data

Dec. 18, 1976 [JP] Japan ................. 51-152605

[51] Int. Cl.² ............... G01F 23/00; G02B 5/14; G08B 21/00
[52] U.S. Cl. .................... 250/227; 250/577; 340/605; 340/619; 350/96.33
[58] Field of Search ............. 250/564, 565, 573, 577, 250/227, 574; 350/96 R, 96 M; 73/293; 137/386, 558; 222/64, 65; 141/95, 198; 340/603, 605, 619; 116/118 R

[56] References Cited

U.S. PATENT DOCUMENTS

| 2,190,027 | 2/1940 | Jordan | 250/227 X |
| 3,448,616 | 6/1969 | Wostl et al. | 73/293 |
| 3,564,526 | 2/1971 | Butts | 340/605 X |
| 4,045,668 | 8/1977 | Pitt et al. | 250/227 |

OTHER PUBLICATIONS

Freeman, "Liquid Level Indicator," IBM Technical Disclosure Bulletin, vol. 5, No. 1, Jun., 1962, p. 87.

Primary Examiner—Siegfried H. Grimm
Attorney, Agent, or Firm—Stevens, Davis, Miller & Mosher

[57] ABSTRACT

An improved apparatus suitable for detecting the outflow of a liquid such as petroleum or the like and petrochemical products from a storage tank or pipe line thereof is disclosed. The detecting apparatus comprises a detecting element including a light transmitting path made of a transparent solid material having a refractive index larger than the refractive index of water through which the light is transmitted from a light source to a light detector. If the peripheral wall surface of the light transmitting path is wetted with a liquid to be detected which has a larger refractive index than the material forming the light transmitting path, the light being transmitted through the path leaks out of the path at the wetted area of the peripheral wall surface due to the difference of the refractive index between the liquid and the path. Therefore, the presence of the liquid to be detected contacting with the light transmitting path can be detected by detecting a change in the quantity of the light which has passed through the path.

5 Claims, 7 Drawing Figures

APPARATUS FOR DETECTING OILS AND THE LIKE

BACKGROUND OF THE INVENTION

This invention relates to an apparatus for detecting oils and the like.

With the increase in demand of petroleum and advances in the petrochemical industry in recent years, the quantity of liquids of petroleum and petrochemical products to be stored has increased and the tanks for storing these liquids have been made to have a large volume.

Consequently, the various effects from the outflow of a stored liquid from a storage tank caused by the operational mistake or mechanical damage of the pipe line connected to the tank are very serious, and the baneful influence of such an accident as mentioned above has already been demonstrated by the accidental discharge of a large quantity of heavy oil in the chemical industrial area off the coast of the Inland Sea of Japan.

In the event of the discharge of a liquid stored in a storage tank or the pipe line of the tank in large quantities it is necessary to detect the outflow of the liquid as soon as possible and to adopt promptly a proper countermeasure such as, for example, closing of the gates of an oil preventing barrier, reinforcing the oil preventing barrier, or establishing oil preventing dikes by using sandbags or oil fences to prevent the liquid from spreading widely over adjacent areas or flowing into a neighboring river or sea.

Accordingly, it is important to provide means for surely and quickly detecting the accidental discharge of a liquid stored in a storage tank from the tank or the pipe line of the tank, and several kinds of detecting means have already been proposed or devised, but all of the detecting apparatus now being in practical use are constructed on the basis of the principle of detecting an oil layer formed on the surface of water by the use of a float utilizing, for instance, the difference between the specific gravity of the oil and the water, or the difference in the electromagnetic properties of the oil from that of the water.

Using an oil detecting apparatus of the conventional design mentioned above, requires the existence of a water surface on which an oil layer formed, and it is impossible to use the oil detecting apparatus in a place where the water surface cannot exist.

Therefore, the use of the oil detecting apparatus of the conventional design is limited in that the selection of the place for arranging the apparatus is fixed.

Also, the conventional oil detecting apparatus has another defect or disadvantage in that a number of separate detecting apparatus are required with proper distribution and arrangement properly distributed to detect surely and very quickly the outflow of oil from the tank or the pipe line at any location along the peripheral wall of the tank and the pipe line before the oil spreads over a large area, and it is necessary to use a large number of detecting apparatus when the tank is of a large volume and the pipe line is extensive.

OBJECTS AND SUMMARY OF THE INVENTION

The object of this invention is to provide an apparatus for detecting oils and the like, which does not detect the presence of a layer of oil or the like formed on a surface of water as in the conventional detecting apparatus, but can detect the presence of discharged oil or the like itself regardless of the existence or nonexistence of a water surface so that no limitation shall be imposed on the place for arranging the apparatus.

Another object of this invention is to provide an apparatus for detecting outflow of oil from the storage tank or the pipe line of the tank, having an elongated detecting element formed in the shape of a line and which can detect over an extended area any kind of discharged oil surely and quickly, the quantity of discharged oil and the area of the discharged oil, by the use of a minimum number of detecting apparatus, without requiring a large number of detecting apparatus distributively arranged over the detecting area.

Briefly stated, according to the present invention, the above mentioned objects are obtained by an apparatus for detecting oils and the like, which comprises a detecting element including a light transmitting path made of a transparent solid material having a refractive index substantially equal to or smaller than the refractive index of the liquid substance to be detected but larger than the refractive index of the water, a light source to project the light on one end of said light transmitting path to transmit the light through the path, and a light detector to detect the light passed through said light transmitting path, wherein the presence of the liquid substance to be tested is detected by the detection of the variation of the quantity of the light passed through the path caused by the leakage of the light at the portion of the path contacting with said liquid substance. Alternatively, an apparatus for detecting oils and the like according to the present invention comprises a detecting element including a light transmitting path made of a transparent solid material having a refractive index larger than the refractive index of water and an outer layer arranged to surround the outer periphery of said light transmitting path, said outer layer containing a solid substance soluble in the liquid substance to be detected but insoluble to the water and having a refractive index larger than the refractive index of the transparent solid material forming the light transmitting path, a light source to project light on the end surface at one end of the light transmitting path, and a light detector to detect the light passed through said light transmitting path, and wherein the presence of the liquid substance to be detected is detected by the detection of the variation of the quantity of light passed through the path resulting from leakage of light at the portion of the path contacting the liquid substance in which said solid substance is dissolved.

If it is desired, the detecting apparatus of the present invention may comprise a plurality of detecting elements and the light transmitting paths of all of the detecting elements may be connected to each other in a spaced apart but in a line relationship to form an elongated continuous light passage through which the light is transmitted.

BRIEF DESCRIPTION OF THE DRAWINGS

The specific features and advantages of the invention will become apparent by reference to the detailed description of the invention and the accompanying drawings wherein.

DETAILED DESCRIPTION OF THE INVENTION

The construction and the principle of the operation of the detecting apparatus of the invention will be explained.

Figure 1:
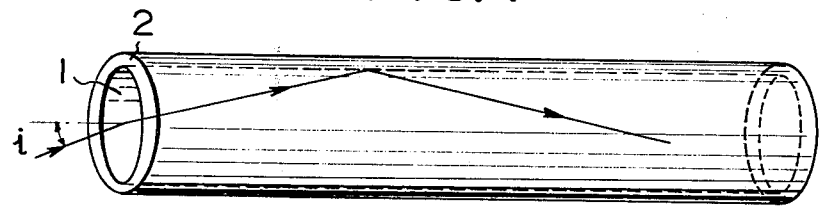
FIG. 1 is a perspective view of a conventional optical fiber.

Heretofore, an optical fiber 1 shown in FIG. 1 has been used as a light transmitting path. The optical fiber shown in FIG. 1 consists of a core 1 made of a transparent solid material having a relatively high refractive index and a coating layer 2 made of a transparent solid material having a lower refractive index covering the peripheral surface of the core 1.

Assuming that the refractive index of the core 1 is $n_1$, the refractive index of the coating layer 2 is $n_2$, and the refractive index of the medium surrounding the outer periphery of the coating layer 2 (usually it is air) is $n_3$. When the materials forming respectively the core 1 and the coating layer 2 are selected to fulfil the relationship $n_1 > n_2 > n_3$, the light projected into the core 1 through one end surface thereof is transmitted to the other end of the core 1 as the result of repeated internal reflection.

The maximum value $i_{max}$ of the angle of incidence at which the light projected on the end surface at one end of the core 1 can be transmitted through the core is indicated by the formula:

$$i_{max} = \sin^{-1}\sqrt{n_1^2 - n_2^2}$$

and the numerical aperture NA which is the rough measure of the efficiency of the optical fiber is indicated by the formula $$NA = \sqrt{n_1^2 - n_2^2}$$

In the case where the optical fiber is bent with a radius of curvature R, the numerical aperture NA is indicated as the first approximation by the formula:

$$NA = \left\{ n_1^2 - n_2^2 \frac{(R + 2a)}{R + x} \right\}^{\frac{1}{2}}$$

$$= \left\{ n_1^2 - n_2^2 \frac{(1 + \frac{2a}{R})}{1 + \frac{x}{R}} \right\}^{\frac{1}{2}}$$

where a is the radius of core 1, x is the distance of the point of incidence of the light on the end surface from the periphery of the end surface nearest to the center of curvature, and thus $0 \leq x \leq 2a$.

Therefore, if $(2a)/R < 1$, then $$\frac{1 + \frac{2a}{R}}{1 + \frac{x}{R}} \approx 1$$

and the numerical aperture NA of the optical fiber does not change appreciably when the fiber is used in the bent state with a relatively large radius of curvature.

On the other hand, it is apparent that the numerical aperture NA can be changed over a certain range by selecting the value of (2a)/R appropriately.

The optical fiber is commonly used in the form of a bundle of fibers which is formed by bundling a plurality of elemental optical fibers in parallel, and the coating layer 2 covered on the periphery of the core 1 serves to prevent the core 1 from leaking the light into the cores of adjacent optical fibers when the optical fiber is included in the bundle of fiber as an elemental optical fiber.

Thus, in the case of only one optical fiber which forms one elemental optical fiber of the bundle of fiber, or in the case of the total quantity of the light transmitted through the bundle of optical fibers, it is possible to replace the coating layer by the surrounding medium, and to satisfy the relationships expressed by the formulas described above by keeping the relationship of $n_1 > n_3$ between the refractive index $n_1$ of the core 1 and the refractive index of $n_3$ the surrounding medium.

Figure 2:
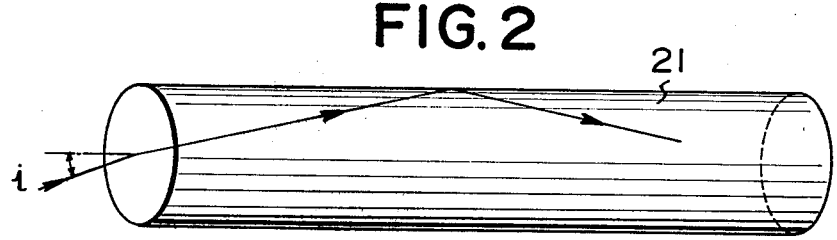
FIGS. 2 and 3 are perspective views of an light transmitting path to illustrate the principle of the operation of the detecting element used in the detecting apparatus of the invention.
Figure 3:
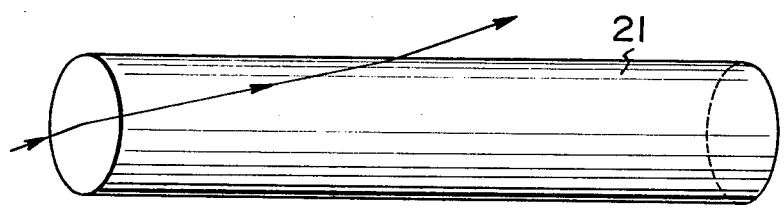

FIGS. 2 and 3 are the drawings to illustrate the principle of operation of the detecting element used in the detecting apparatus of the invention, and there is shown the light transmitting path 21 made of a homogeneous transparent solid material having a refractive index n.

When the medium surrounding the light transmitting path 21 is air, and the refractive index n of the light transmitting path 21 is larger than the refractive index of air (the refractive index of air is about 1), the light projected on the end surface at one end of the light transmitting path 21 is transmitted to the other end of the path 21, as shown in FIG. 2, in the same manner as explained in reference to FIG. 1.

In the case where the medium surrounding the light transmitting path 21 is not air, but is a medium having a refractive index substantially equal to or larger than the refractive index n of the light transmitting path, the relationship $NA \approx 0$ or $NA = 0$ is obtained, and the light projected on the end surface at one end of the light transmitting path 21 which penetrates into the path leaks out from the path into the surrounding medium, as shown in FIG. 3, and is not transmitted to the other end of the path 21.

In the case where a portion of the peripheral surface of the light transmitting path 21 is in contact with a medium having a refractive index substantially equal to or larger than the refractive index n of the path 21, and the remaining portion of the peripheral surface of the path 21 is surrounded by air, a portion of the light projected into the light transmitting path 21 through one end surface leaks out from the path and the quantity of the light transmitted to the other end of the path 21 decreases.

Figure 4:
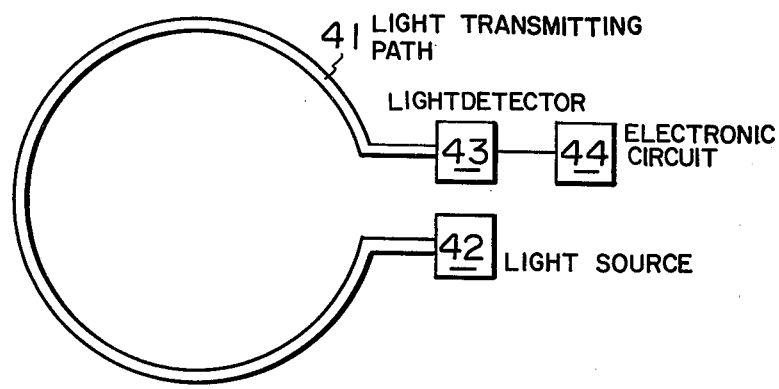
FIG. 4 is a schematic drawing showing an embodiment of the detecting apparatus of the invention.

In FIG. 4 there is shown one embodiment of the detecting apparatus of the invention, which comprises a light transmitting path 41, a light source 42, a light detector 43 including a photo-electric transducer such as, for example, a photo cell or phototransistor, and an electronic circuit 44 including an amplifier to amplify the output of the transducer and an alarm. The light transmitting path 41 is made of a highly transparent flexible solid material which is easily workable, water resisting, oil resisting, weather proof, has a low light transmission loss and a refractive index described hereinafter, and has the shape of an elongated fiber or cord of a circular cross section.

Most of the liquids of petroleum or the like and petrochemical products are liquid hydrocarbons, and the refractive index of liquid hydrocarbons differ from each other according to the kinds of hydrocarbon, but are generally larger than the refractive index of water (it is about 1.33), the refractive index increasing with the specific gravity of the hydrocarbon.

For instance, the refractive index of gasoline and kerosine is about 1.4, the refractive index of light oil is about 1.5, and the refractive index of the oils of grater specific gravity than light oil are greater than 1.5.

Therefore, in the case where the object of detection is light oil or an oil having a larger refractive index than that of light oil, the light transmitting path 41 is made of a transparent solid material having a refractive index substantially equal to or slightly less than the refractive index of the oil to be detected, for example methyl methacrylate resin which has a refractive index of about 1.49.

Arranging the light transmitting path 41 to surround the periphery of the foundation of a storage tank and pipe line to be watched, and projecting from the light source 42 a given quantity of visual light into the light transmitting path 41 through the end wall of one end of the path, the light reaches the other end of the light transmitting path 41 with repeating internal reflections without leaking out from the path through the peripheral wall of the path, and is received by the light detector 43 positioned at the other end of the path.

In such a condition as mentioned above, even though the peripheral wall surface is wet with water as the result of rain or dewfall, the light projected into the light transmitting path 41 does not leak out through the peripheral wall of the path, since the refractive index of the light transmitting path 41 is larger than the refractive index of water.

When the oil stored in the storage tank flows out from the tank or the pipe line, and a portion or a considerable area of the peripheral surface of the light transmitting path 41 is wet with oil, the light projected into the path leaks out from the path through the peripheral wall with the oil and the quantity of light incident to the light detector 43 decreases in proportion to the area of the peripheral wall surface which is wet with oil.

Therefore, the output signal voltage of the light detector 43 decreases in accordance with the decrease in quantity of received light, and thus if the alarm included in the electronic circuit 44 is set to be operated in response to the change of the output signal voltage, it is possible to detect quickly and surely the discharge of the oil from the tank or the pipe line.

In the case where the object of detection is gasoline or an oil having almost the same refractive index as gasoline, it is possible theoretically to detect the gasoline or the oil by making the light transmitting path 41 of the transparent solid material which has a refractive index substantially equal to or slightly smaller than the refractive index of the gasoline, such as for instance a glass having a relatively small refractive index, but in practice if the refractive index of the light transmitting path 41 was made smaller than the refractive index of the gasoline (it is about 1.4), it is very difficult to clearly distinguish the case where the peripheral wall surface of the path is wet with oil from the case the peripheral wall surface of the path is wet with water, since the difference in the refractive index of the light transmitting path 41 from the refractive index of water (it is about 1.33) becomes very small.

Figure 5:
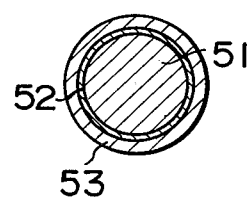
FIG. 5 is a cross sectional view of the detecting element of an alternative form used in the detecting apparatus of the invention.

In such a case as mentioned above, it is possible to easily and surely detect the gasoline or an oil having almost the same refractive index as gasoline by constructing the detecting element as shown in FIG. 5.

The detecting element shown in FIG. 5 comprises a light transmitting path 51 made of a transparent solid material having a refractive index much larger than the refractive index of water, such as for instance methyl methacrylate resin, an oil pervious separating film 52 made of a material having a refractive index smaller than the light transmitting path 51, such as for instance Teflon (the trade name of polyfluoroethylene), and a cloth tape 53 inpregnated with a solid substance soluble in the oil but insoluble to water and having a refractive index larger than the refractive index of the light transmitting path, such as for instance naphthalene, asphalt or pitch (hereinafter referred to as "a refractive index increasing agent").

Generally, it is possible to increase the refractive index of a liquid by dissolving in the liquid a substance which has a larger refractive index than the liquid, thus if the gasoline or the like oil discharged from the storage tank or the pipe line contacts with the cloth tape 53 of the detecting element, the refractive index increasing agent impregnated in the cloth tape 53 dissolves in the gasoline or the oil, and as a result the refractive index of the gasoline or the oil is increased.

The gasoline or the oil, the refractive index thereof having been increased by the refractive index agent, wets the peripheral wall surface of the light transmitting path 51 by penetrating the cloth tape 53 and the oil pervious separating film 52, and therefore the discharge of the gasoline or the oil can easily and surely be detected in the same manner as in the embodiment shown in FIG. 4.

When the cloth tape 53 was wet with water, as the result of rain or dew fall for example, the refractive index increasing agent does not dissolve in water and the refractive index of water is never increased by the refractive index increasing agent.

Consequently, the light leakage from the light transmitting path 51 through the peripheral wall thereof is not caused, even if water penetrated the cloth tape 53 and the pervious separating film 52 and wet the peripheral wall surface of the light transmitting path 51.

It is preferable to use a material having a smaller refractive index than the light transmitting path 51 as the material to form the pervious separating film 52, as mentioned above, but the oil pervious separating film 52 may be made of a material having a refractive index nearly equal to or larger than the refractive index of the light transmitting path 51, if the separating film 51 is contacted with the peripheral wall surface of the light transmitting path 51 to leave a large number of small air gaps between the inner surface of the film 52 and the wall surface of the path 51 by forming on the inner surface of the film 52 for example a large number of small indents uniformly distributed over the whole surface Now, considering the limits of the length of the light transmitting path 41 or 51 practically usable, the main factors which limit the length of the light transmitting path are (1) the quantity of attenuation of light passing through the path, (2) the quantity of light projected into the path through the end wall thereof, and (3) the light sensitivity of the light detector which detects the light transmitted through the path.

The quantity of attenuation of light in the light transmitting path is determined by the properties of the material forming the path, the construction of the path, and the wave length of the incident light.

The attenuation of light in methyl methacrylate resin and the ordinary glass is relatively large, and for an organic material such as methyl methacrylate resin and the like the incident light which can be practically used is limited to light having a wave length within the visual range while for the glass the incident light having a wave length within the visual range and the infrared range can be used practically.

The transmissivity of methyl methacrylate resin and ordinary glass are about the same for light having a wave length within the visual range, and therefore the limit of the length of the light transmitting path is determined, in both cases where the methyl methacrylate resin and the glass are used respectively as the material of the light transmitting path, by the quantity of the incident light corresponding to the attenuation caused in the path and the quantity of the light detectable by the light detector or the light sensitivity of the light detector.

That is to say, the limit of the length of the light transmitting path is determined by the selection of the light source, the technique to project the light from the light source into the light transmitting path with a minimum loss, and the selection of the light detector.

For instance, in the case where a luminescent diode is used as the light source and a silicone photocell is used as the light detector, the length of the light transmitting path made of methyl methacrylate resin or ordinary glass practically usable is several meters.

In the case where a laser light source having a light output of a magnitude of a few miliwatts is used together with the same light detector and light transmitting path as mentioned above, the limit of the practical length of the light transmitting path is about twenty to thirty meters.

Furthermore, as the results of the recent development in the techniques of light communication, a light transmitting path having very low light attenuation of a magnitude of about two decibel per one kilometer has already been realized, and thus it is possible to lengthen the practical length of the light transmitting path of the apparatus of the invention to a few hundred meters by utilizing such a light transmitting path having very low light attenuation.

The light transmitting path may be formed in the shape of a short cylinder, a rectangular block or a spiral, instead of a linear shape.

Figure 6:
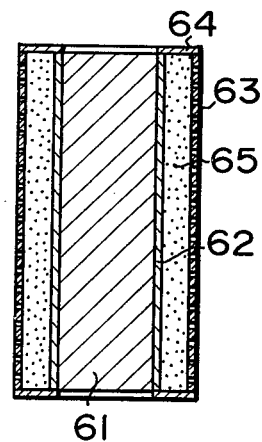
FIG. 6 is a longitudinal sectional view of the detecting element of another alternative form according to the invention.

When the length of the light transmitting path is relatively short, the detecting element according to the invention may be formed as shown in FIG. 6. The detecting element shown in FIG. 6 comprises a light transmitting path 61 made of the same material as used in the embodiments shown in FIGS. 4 and 5, an oil pervious separating film 62 made of a material as used in the embodiment shown in FIG. 5 and covering the peripheral wall surface of the path 61, a porous protective tube 63 coaxially surrounding the oil pervious separating film 62 at a small interval to form an annular space between the tube 63 and the film 62, two annular end plates 64 closing the both ends of said annular space, and a powdered refractive index increasing agent 65 enclosed in the annular space between the film 62 and the tube 63.

When the gasoline or the like oil discharged from a storage tank or a pipe line penetrates into the annular space through the porous protective tube 63 and contacts with the powdered refractive index increasing agent 65 enclosed in the space, the refractive index increasing agent 65 dissolves in the gasoline or the like oil so that the refractive index of the gasoline or the like oil is increased by the dissolved agent, but the powdered refractive index increasing agent 65 does not increase the refractive index of water by dissolving in water, even if water penetrate through the porous protective tube 63 into the annular space between the tube 63 and the film 62.

Therefore, the outflow of gasoline or like oil from the storage tank or the pipe line can be surely and easily detected by the use of the detecting element shown in FIG. 6, in the same manner as in the embodiment shown in FIG. 5, by detecting the leakage of light from the light transmitting path 61 that takes place at the portion of the peripheral wall of the path wet by the gasoline or the like oil containing the refractive index increasing agent.

In the apparatus using the detecting element shown in FIG. 6, the light source and the light detector may be positioned respectively at each end of the light transmitting path 61, but if desired it is possible to position the light source and the light detector at one end of the light transmitting path 61 and a reflecting plate or a mirror at the other end of the path 61 so as to direct the incident light from the light source to the reflecting plate or the mirror and to direct the reflected light from the reflecting plate or the mirror to the light detector. In the latter arrangement, the light source and the light detector may be placed side by side or coaxially to each other, and further may be formed as separate devices or a combined single device.

The porous protective tube 63 and the powdered refractive index increasing agent 65 enclosed in the annular space between the tube 63 and the oil pervious separating film 62 of the detecting element shown in FIG. 6 may be replaced by a cloth tape impregnated with a solid refractive index increasing agent wrapped closely around the separating film 62.

According to the other embodiment of the invention, the detecting apparatus is constructed by using a plurality of detecting elements shown in FIG. 6.

Figure 7:
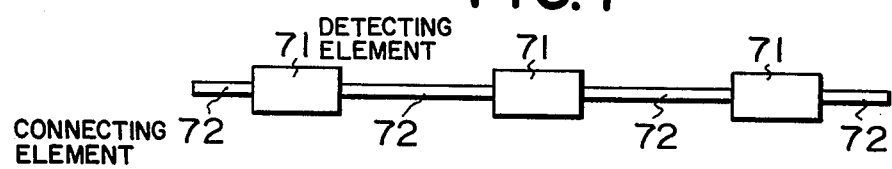
FIG. 7 is a schematic figure showing a plurality of detecting elements, the light transmitting paths of which are connected to each other to form an elongated continuous light passage.

In this embodiment, the light transmitting paths of all of the detecting elements 71 are serially connected, as shown in FIG. 7, by means of connecting elements 72 made of a transparent solid material having a property of low light attenuation in a spaced apart and aligned in a line relationship to each other to form an elongated continuous light passage common to all detecting elements 71, and a light source and a light detector are disposed respectively at each end of said common light passage to transmit the light from the light source at one end to the light detector at the other end through the common light passage in which the light transmitting path of each detecting element are all included.

Although the present invention has been illustrated and described with reference to specific embodiments of the invention, it will be understood that various modifications may be made by persons skilled in the art without departing from the spirit and the scope of the invention which is defined solely by the appended claims.

I claim:

1. An apparatus for detecting oils and the like, characterized in that said apparatus comprises a detecting element including a light transmitting path made of a transparent solid material having a refractive index larger than the refractive index of water, an outer layer surrounding the outer peripheral surface of said light transmitting path, said outer layer containing a solid substance which is soluble in the liquid substance to be detected but is insoluble in water and having a refractive index larger than the refractive index of the transparent solid material forming said light transmitting path, and a separating layer interposed between said light transmitting path and said outer layer, said separating layer being made of a material having a refractive index smaller than the refractive index of the transparent solid material forming said light transmitting path and is pervious to the liquid substance to be detected; a light source disposed at one end of said light transmitting path; and a light detector disposed at the other end of said light transmitting path.

2. An apparatus for detecting oils and the like, characterized in that said apparatus comprises a detecting element including a light transmitting path made of a transparent solid material having a refractive index larger than the refractive index of water, an outer layer surrounding the outer peripheral surface of said light transmitting path, said outer layer containing a solid substance which is soluble in the liquid substance to be detected but is insoluble in water and having a refractive index larger than the refractive index of the transparent solid material forming said light transmitting path, and a separating layer interposed between said light transmitting path and said outer layer, said separating layer being made of a material having a refractive index smaller than the refractive index of the transparent solid material forming said light transmitting path and is pervious to the liquid substance to be detected; a light source and a light detector disposed at one end of said light transmitting path; and a light reflecting body disposed at the other end of said light transmitting path.

3. An apparatus for detecting oils and the like, characterized in that said apparatus comprises a detecting element including a light transmitting path made of a transparent solid material having a refractive index larger than the refractive index of water, an outer layer surrounding the outer peripheral surface of said light transmitting path, said outer layer containing a solid substance which is soluble in the liquid substance to be detected but is insoluble in water and having a refractive index larger than the refractive index of the transparent solid material forming said light transmitting path, and a separating layer interposed between said light transmitting path and said outer layer, said separating layer being pervious to the liquid substance to be detected and being contacted with the outer peripheral surface of said light transmitting path to leave between the layer and the surface a large number of small air gaps uniformly distributed along the surface; a light source disposed at one end of said light transmitting path; and a light detector disposed at the other end of said light transmitting path.

4. An apparatus for detecting oils and the like, characterized in that said apparatus comprises a detecting element including a light transmitting path made of a transparent solid material having a refractive index larger than the refractive index of water, an outer layer surrounding the outer peripheral surface of said light transmitting path, said outer layer containing a solid substance which is soluble in the liquid substance to be detected but is insoluble in water and having a refractive index larger than the refractive index of the transparent solid material forming said light transmitting path, and a separating layer interposed between said light transmitting path and said outer layer, said separating layer being pervious to the liquid substance to be detected and being contacted with the outer peripheral surface of said light transmitting path to leave between the layer and the surface a large number of small air gaps uniformly distributed along the surface; a light source and a light detector disposed at one end of said light transmitting path; and a light reflecting body disposed at the other end of said light transmitting path.

5. An apparatus for detecting oils and the like, characterized in that said apparatus comprises a plurality of detecting elements, each of said detecting elements including a light transmitting path made of a transparent solid material having a refractive index larger than the refractive index of water, an outer layer surrounding the outer peripheral surface of said light transmitting path, said outer layer containing a solid substance soluble in the liquid substance to be detected but insoluble in water and having a refractive index larger than the refractive index of the solid material forming said light transmitting path, and a separating layer interposed between said light transmitting path and said outer layer, said separating layer being pervious to the liquid substance to be detected and being in contact with the outer peripheral surface of said light transmitting path to leave between the layer and the surface a large number of small air gaps uniformly distributed along the surface; a plurality of connecting elements made of a transparent solid material having a property of low light attenuation for connecting the light transmitting paths of all of said detecting elements spaced apart and in a line to each other to form an elongated continuous light passage; a light source to pass light through said continuous light passage; and a light detector to detect the light passed through said continuous light passage.

* * * * *